JOHN E. FINLEY.
Improvement in Churns.
No. 114,785. Patented May 16, 1871.
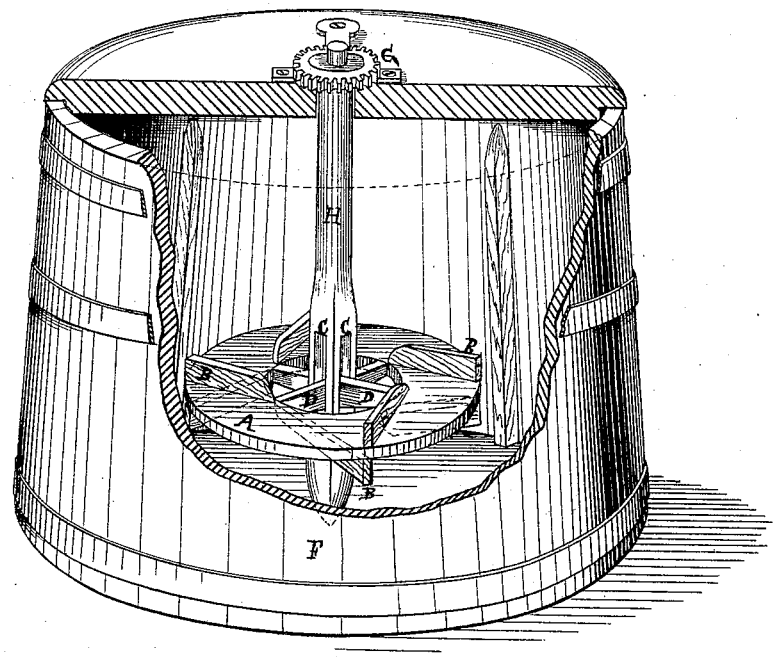
Witnesses.
D. E. Castle
Wm. H. Mason
Inventor:
John E. Finley

UNITED STATES PATENT OFFICE.

JOHN E. FINLEY, OF MEMPHIS, TENNESSEE.

IMPROVEMENT IN CHURNS.

Specification forming part of Letters Patent No. 114,785, dated May 16, 1871.

*To all whom it may concern:*

Be it known that I, JOHN E. FINLEY, of Memphis, in the county of Shelby, in the State of Tennessee, have invented a new and useful Improvement in Churns; and I do hereby declare that the following is a full, clear, and exact description of the same, reference being had to the accompanying drawing, and to the letters of reference marked thereon.

The nature of my invention consists in the construction of a churn-dasher in the form of a disk or wheel, with radiating flanges attached on the upper and under sides of the dasher, with the upper flanges radiating in an opposite direction from those on the under side, for the purpose of throwing the cream in the process of churning in contrary directions, and the providing of slots for the purpose of allowing the dasher to rise or fall with the cream in the churn.

The drawing represents a perspective view, showing a portion of the front of the churn or tub cut away, for the purpose of showing the construction of the dasher and slots.

A is the body of the dasher, constructed in the form of a plain disk, with a cross-bar or spokes in the center; B, flanges fastened on the upper and under sides of the dasher, and radiating those on the upper side in an opposite direction from those on the under side; C, slots to allow the dasher to rise and fall, so as to keep on the surface of the cream in small churnings as well as in larger ones; D, cross-bars or spokes; G, driving-wheel, through which motion is conveyed to the dasher; F, tub or churn; H, shaft.

The cream to be churned is placed in the tub F, and it will be found that as soon as the dasher is revolved by the motion communicated to it by the driving-wheel G, the cream will be thrown by the opposing flanges B violently in opposite directions.

What I claim as my invention, and desire to secure by Letters Patent, is—

The disk-shaped dasher A, with its flanges B and cross-bars or spokes D, when arranged in connection with the slotted shaft H, constructed and operated substantially as herein shown and described.

JOHN E. FINLEY.

Witnesses:
   D. G. DODGE,
   JOHN P. BOUGHNER.